United States Patent
Kerkes

(10) Patent No.: US 11,463,770 B2
(45) Date of Patent: *Oct. 4, 2022

(54) METHODS AND APPARATUS TO IDENTIFY MEDIA PRESENTATIONS BY ANALYZING NETWORK TRAFFIC

(71) Applicant: The Nielsen Company (US), LLC, New York, NY (US)

(72) Inventor: Joseph Kerkes, Lutz, FL (US)

(73) Assignee: The Nielsen Company (US), LLC, New York, NY (US)

( * ) Notice: Subject to any disclaimer, the term of this patent is extended or adjusted under 35 U.S.C. 154(b) by 40 days.

This patent is subject to a terminal disclaimer.

(21) Appl. No.: 17/068,533

(22) Filed: Oct. 12, 2020

(65) Prior Publication Data

US 2021/0029414 A1    Jan. 28, 2021

Related U.S. Application Data

(63) Continuation of application No. 16/209,897, filed on Dec. 4, 2018, now Pat. No. 10,805,690.

(51) Int. Cl.
*H04N 21/442* (2011.01)
*H04N 21/647* (2011.01)
(Continued)

(52) U.S. Cl.
CPC ..... *H04N 21/44224* (2020.08); *H04N 21/233* (2013.01); *H04N 21/23418* (2013.01);
(Continued)

(58) Field of Classification Search
None
See application file for complete search history.

(56) References Cited

U.S. PATENT DOCUMENTS 7,809,826 B1    10/2010   Guruswamy
9,380,356 B2     6/2016   McMillan et al.
(Continued)

FOREIGN PATENT DOCUMENTS

KR   1020180024841 A   3/2018
WO      2020117571 A1   6/2020

OTHER PUBLICATIONS

International Searching Authority, "International Search Report," issued in connection with Application No. PCT/US2019/063468, dated Mar. 20, 2020, 3 pages.
(Continued)

*Primary Examiner* — James R Marandi
(74) *Attorney, Agent, or Firm* — Hanley, Flight & Zimmerman, LLC

(57) ABSTRACT

Methods, apparatus, systems and articles of manufacture are disclosed herein to identify media presentation by analyzing network traffic. Example instructions cause a machine to generate a traffic profile to reduce a computational burden of identifying streaming media being presented on a media presentation device, the traffic profile including first network traffic data indicative of the streaming media; obtain the traffic profile and second network traffic data corresponding to the streaming media; and generate, in response to a score for the second network traffic data meeting a threshold of similarity, a network traffic analysis report identifying the streaming media being presented on the media presentation device.

38 Claims, 10 Drawing Sheets

(51) Int. Cl.
    *H04N 21/234*     (2011.01)
    *H04N 21/24*     (2011.01)
    *H04N 21/233*     (2011.01)
    *H04L 41/50*     (2022.01)
    *H04L 43/06*     (2022.01)
    *H04H 60/29*     (2008.01)
    *H04L 67/50*     (2022.01)

(52) U.S. Cl.
    CPC ... *H04N 21/2402* (2013.01); *H04N 21/64738* (2013.01); *H04H 60/29* (2013.01); *H04L 41/50* (2013.01); *H04L 43/06* (2013.01); *H04L 67/535* (2022.05)

(56) References Cited

U.S. PATENT DOCUMENTS

| | | | |
|---|---|---|---|
| 9,483,742 | B1 | 11/2016 | Ahmed |
| 9,515,904 | B2 | 12/2016 | Besehanic et al. |
| 10,805,690 | B2 | 10/2020 | Kerkes |
| 2008/0219169 | A1* | 9/2008 | Sargor ................. H04L 43/026 370/238 |
| 2010/0138543 | A1* | 6/2010 | Loman .............. G06F 16/90335 709/227 |
| 2012/0173701 | A1 | 7/2012 | Tenbrock |
| 2013/0111013 | A1 | 5/2013 | Besehanic |
| 2014/0150102 | A1 | 5/2014 | Wang et al. |
| 2014/0282640 | A1 | 9/2014 | Nielsen |
| 2017/0078741 | A1 | 3/2017 | Wright et al. |
| 2017/0264513 | A1 | 9/2017 | Pietrowicz et al. |
| 2018/0191593 | A1* | 7/2018 | De Knijf ................. G06F 16/20 |
| 2018/0331915 | A1 | 11/2018 | Cave et al. |
| 2019/0238952 | A1* | 8/2019 | Boskovich ....... H04N 21/23418 |
| 2020/0092213 | A1* | 3/2020 | Tsilimantos ........ H04L 47/2483 |
| 2020/0177966 | A1 | 6/2020 | Kerkes |
| 2020/0259731 | A1* | 8/2020 | Sivaraman ............ H04L 43/026 |

OTHER PUBLICATIONS

International Searching Authority, "Written Opinion," issued in connection with Application No. PCT/US2019/063468, dated Mar. 20, 2020, 4 pages.

United States Patent and Trademark Office, "Non-Final Office Action", issued in connection with U.S. Appl. No. 16/209,897, dated Jan. 13, 2020, (12 pages).

United States Patent and Trademark Office, "Notice of Allowance", issued in connection with U.S. Appl. No. 16/209,897, dated Jun. 4, 2020, (7 pages).

Patent Cooperation Treaty, "International Preliminary Report on Patentability," issued in connection with Application No. PCT/US2019/063468, dated Jun. 8, 2021, 5 pages.

* cited by examiner

METHODS AND APPARATUS TO IDENTIFY MEDIA PRESENTATIONS BY ANALYZING NETWORK TRAFFIC

RELATED APPLICATION

This patent arises from a continuation of U.S. patent application Ser. No. 16/209,897, (now U.S. Pat. No. 10,805,690) which was filed on Dec. 4, 2018. U.S. patent application Ser. No. 16/209,897 is hereby incorporated by reference in its entirety. Priority to U.S. patent application Ser. No. 16/209,897 is hereby claimed.

FIELD OF THE DISCLOSURE

This disclosure relates generally to media monitoring, and, more particularly, to methods and apparatus to identify media presentations by analyzing network traffic.

BACKGROUND

In recent years, methods of accessing media have evolved. For example, Internet media was primarily accessed via computer systems such as desktop and laptop computers. Recently, the advent of smart devices (e.g. televisions (TVs), smartphones, and streaming devices such as Roku®, Amazon Fire™ TV Stick, Google Chromecast™, Amazon Fire TV Cube, etc.) has allowed access to Internet media in ways that were previously unavailable. As used herein, the term "media" includes any type of content and/or advertisement delivered via any type of distribution medium. Thus, media includes television programming or advertisements, radio programming or advertisements, movies, web sites, streaming media, etc.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
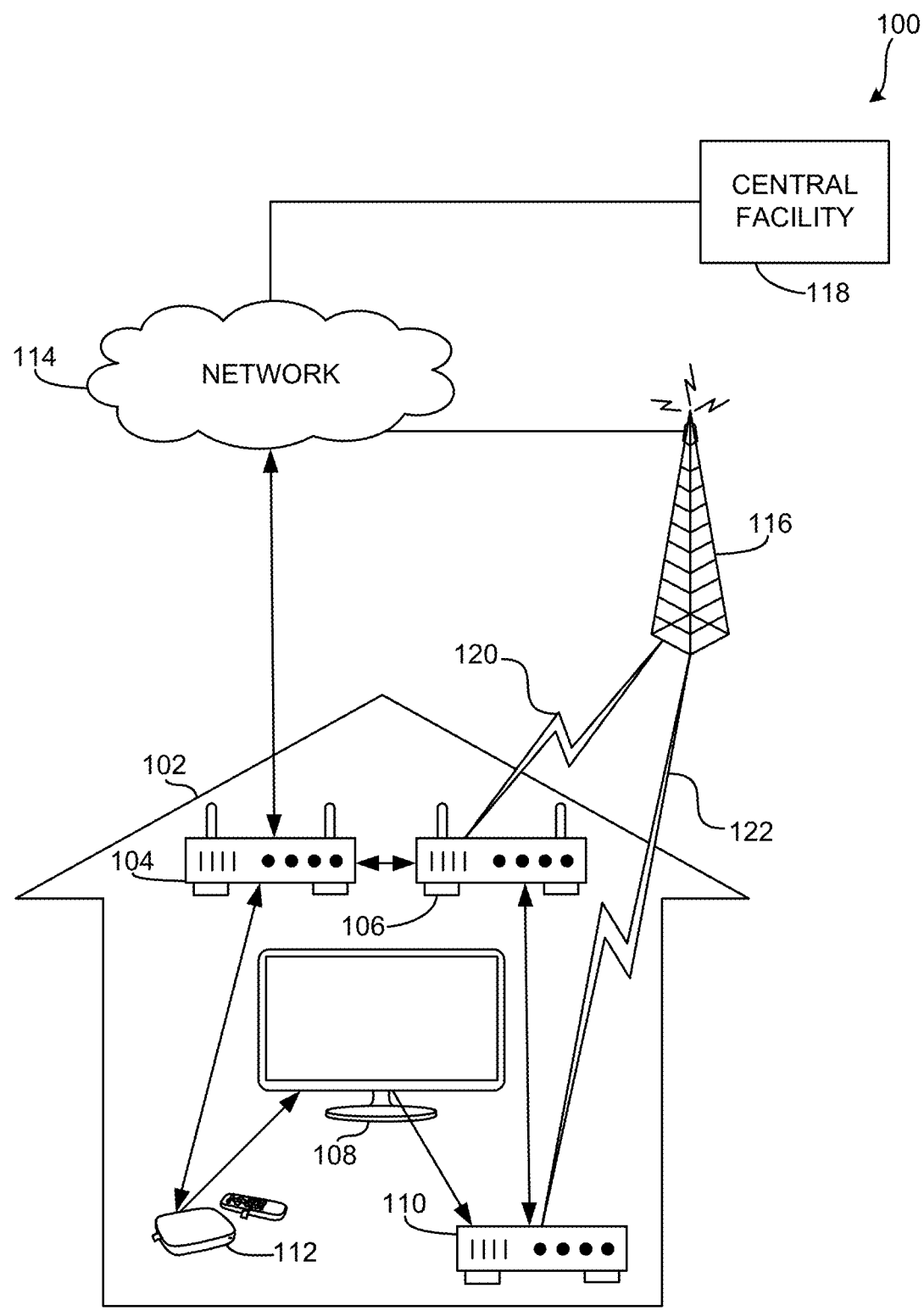
FIG. 1 is a block diagram of an example environment in which an example network meter monitors network traffic data and an example media presentation device meter monitors streaming media.

Example methods, apparatus, and articles of manufacture disclosed herein monitor media presentations at media presentation devices. Such media presentation devices may include, for example, Internet-enabled televisions, personal computers, Internet-enabled mobile handsets (e.g., a smartphone), tablet computers (e.g., an iPad®), etc. In some examples, media may be streamed to the media presentation devices from streaming devices. Such streaming devices may include, for example, video game consoles (e.g., Xbox®, PlayStation®), digital media players (e.g., a Roku media player, a Slingbox®, etc.), etc. In some examples, media monitoring information is aggregated to determine ownership and/or usage statistics of media presentation devices, relative rankings of usage and/or ownership of media presentation devices, types of uses of media presentation devices (e.g., whether a device is used for browsing the Internet, streaming media from the Internet, etc.), and/or other types of media presentation device information.

In examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that matched with the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In recent years, the use of media services (e.g. Netflix™, Hulu™, Prime Video™, HBO GO™, Showtime™, etc.) has moved from almost exclusively on desktop and laptop computers to a wide variety of media presentation devices. Currently, such media services may be accessed through many devices including televisions, smartphones, and streaming devices including Roku, Amazon Fire TV Stick, Google Chromecast, Amazon Fire TV Cube, etc. As used herein, the term streaming refers to media transmitting directly to a streaming device and the streaming device sending media to a media presentation device.

Typically, media monitoring services would monitor the media streamed to desktop and laptop computers by monitoring the media presentation devices to which the media was being sent. This was fairly simple because there existed direct connectivity between the monitoring device and the media presentation devices. For example, a network meter monitored a router in a household and the media streaming through the router. This allowed for a relatively simple method of monitoring the media streaming to the laptop or desktop computer because the media monitoring service needed only monitor the network traffic data, such as the uniform resource locator (URL) for the media being presented or the Internet Protocol (IP) address for the media presentation device to which the media was sent. Furthermore, the network traffic data included data packets which were not encrypted and could be used to determine the type of media streaming to the media presentation device.

With the advent of new methods of streaming (e.g. Roku, Amazon Fire TV Stick, Google Chromecast, Amazon Fire TV Cube, etc.), such network traffic data may not clearly represent the media that is streaming. For example, the network traffic data that is accessible by a network meter is generally encrypted with only a few metrics that are not encrypted. These unencrypted metrics do not accurately represent what data is being transferred over the network. For example, a streaming service, such as Netflix may use content delivery networks, such as Akamai® or Level 3®. In such an example, a streaming device may request media to stream to a media presentation device. The media that is sent to the streaming device may not be clearly represented by unencrypted metrics of the network traffic data. Because of this unclarity, the network traffic data that is collected by the network meter cannot be used to determine if media is streaming on a media presentation device connected to the network. When the streaming device receives the streaming media from a network device such as a router, and sends it to a media presentation device, it may be unclear whether the media is being presented at all. For example, a Roku stick or a Roku box may connect to the Internet and access media. The media is streamed from a network device (e.g. a router) to the Roku stick or the Roku box. The Roku device is communicatively coupled to a media presentation device (e.g., a television (TV)). The Roku device then renders the media to the TV via a media presentation port such as a High Definition Multimedia Interface port (HDMI port). In this example, because the streaming device (e.g., the Roku device) receives the streaming media via a content delivery network, the unencrypted network traffic data does not clearly represent the streaming media (e.g., Netflix) and cannot be used to determine if media is streaming.

Alternatively, a streaming device may send media to a media presentation device via a wireless connection. In this case, the same issue presents itself when trying to identify whether media is streaming based on captured network traffic data.

Other ways in which media may be streamed to a media presentation device include situations in which a streaming device receives media from a network device such as a router. In this example, the streaming device may be a media presentation device, such as a smart phone or a tablet. The smart phone or tablet may then send the media, which it is presenting on itself, to an additional media presentation device such as a television, desktop computer, laptop computer, any other digital display, projector, etc. This is a process commonly referred to as "screen mirroring." Because the media is first being streamed to the smart phone or tablet, the streaming data representing the media being streamed to the additional media presentation device may not be reflective of the media itself. In this example, the media streaming to the additional media presentation device generates a large amount of network traffic data that may be confusing to a media monitoring service when attempting to identify that media is streaming. This excess network traffic data may be characterized as "noise" that presents additional problems when determining whether media is streaming. The term "noise" is used herein to describe interference between network traffic data that is not of interest and network traffic data that is of interest when attempting to use the network traffic data of interest.

These new methods of accessing media on media presentation devices present a problem for media monitoring services. Because the media is sent to streaming devices via network communications that are mostly encrypted, network meters cannot determine the streaming media without the addition of a supplemental meter. Traditionally, a media presentation device meter is used to supplement the network meter in order to identify the media streaming to the media presentation device. With the multiple sources of data, it is possible to identify the streaming media being presented on the media presentation device. However, in presentation environments without supplemental meters, it is not possible to identify the streaming media being presented on the media presentation device.

Prior methods of identifying streaming media being presented on a media presentation device using a network meter required the use of multiple meters to identify the streaming media. In situations where only a network meter is present, prior methods cannot determine the streaming media being presented on the media presentation device because the collected network traffic data does not provide enough information to identify the media. The collected network traffic data alone could represent a number of different tasks being done on a network. For example, a media presentation device may be presenting streaming media being streamed to it. This may be represented in the network traffic data as URLs related to a streaming service. However, with this information alone, a media monitoring service cannot distinguish whether the media presentation device is actually presenting streaming media. Additional media presentation devices such as smartphones, tablets, or computers, may be presenting the streaming media and the collected network traffic data does not clearly represent which media presentation device is presenting the streaming media or whether the streaming media is actually being presented rather than a process related to a streaming media application running the background on a media presentation device.

Examples disclosed herein include correlating first network traffic data collected by a network meter to streaming data collected by a media presentation device meter; determining second network traffic data that pertains to streaming media streaming on a streaming device, the second network traffic data based on the first network traffic data; and generating a traffic profile based on a relationship between the second network traffic data and the streaming media streaming on a streaming device.

FIG. 1 is a block diagram of an example environment 100 in which an example network meter monitors network traffic data and an example media presentation device meter monitors streaming data. The example environment 100 includes an example media exposure measurement location 102, an example wireless communication system 116, an example network 114, and an example central facility 118. The example media exposure measurement location 102 includes an example network device 104, and example network meter 106, and example media presentation device 108, and example media presentation device meter 110, and an example streaming device 112. The network 114 is communicatively coupled to the wireless communication system 116 and devices in the media exposure measurement location 102. The central facility 118 is communicatively coupled to the network 114. The wireless communication system 116 is communicatively coupled to the network 114 and devices in media exposure measurement location 102. The wireless communication system 116 is communicatively coupled to devices in the media exposure measurement location by an example network meter communication link 120 and example media presentation device meter communication link 122.

The media exposure measurement location 102 of the illustrated example of FIG. 1 is a panelist household. However, the media exposure measurement location 102 may be any other location, such as, for example an Internet café, an office, an airport, a library, a non-panelist household, etc. While in the illustrated example a single media exposure measurement location 102 is shown, any number and/or type(s) of media exposure measurement locations may be used.

The panelist household may include one or more panelists. The panelists are users registered on panels maintained by a ratings entity (e.g., an audience measurement company) that owns and/or operates the ratings entity subsystem. Traditionally, audience measurement entities (also referred to herein as "ratings entities") determine demographic reach for advertising and media programming based on registered panel members. That is, an audience measurement entity enrolls people that consent to being monitored into a panel. During enrollment, the audience measurement entity receives demographic information from the enrolling people so that subsequent correlations may be made between advertisement/media exposure to those panelists and different demographic markets.

People (e.g., households, organizations, etc.) register as panelists via, for example, a user interface presented on a media device (e.g., via a website). People may be recruited as panelists in additional or alternative manners such as, for example, via a telephone interview, by completing an online survey, etc. Additionally or alternatively, people may be contacted and/or enlisted to join a panel using any desired methodology (e.g., random selection, statistical selection, phone solicitations, Internet advertisements, surveys, advertisements in shopping malls, product packaging, etc.).

Returning to the illustrated example of FIG. 1, the media exposure measurement location 102 includes the network device 104, the network meter 106, the media presentation device 108, the media presentation device meter 110, and the streaming device 112. The network device 104 is communicatively coupled to a plurality of devices in the media exposure measurement location 102. For example, the network device 104 is communicatively coupled to the network meter 106 and the streaming device 112. The example network meter 106 is communicatively coupled to the network device 104, the media presentation device meter 110. The network meter 106 is also communicatively coupled to the wireless communication system 116 by the network meter communication link 120. The media presentation device meter 110 is communicatively coupled to the media presentation device 108 and the network meter 106. The media presentation device meter 110 is also communicatively coupled to the wireless communication system 116. The media presentation device meter 110 is communicatively coupled to the wireless communication system 116 by the example media presentation device meter communication link 122. The streaming device 112 is communicatively coupled to the media presentation device 108 and the network device 104. The media presentation device is communicatively coupled to the streaming device 112 and the media presentation device meter 110.

The network device 104 of the illustrated example of FIG. 1 is a router that enables the media devices in the media exposure measurement location 102 to communicate with the network 114 (e.g., the Internet.) In some examples, the network 114 may be implemented using any suitable wired and/or wireless network(s) including, for example, one or more data busses, one or more Local Area Networks (LANs), one or more wireless LANs, one or more cellular networks, one or more private networks, one or more public networks, etc. The example network 114 enables the example network device 104 to be in communication with the example central facility 118. As used herein, the phrase "in communication," including variances therefore, encompasses direct communication and/or indirect communication through one or more intermediary components and does not require direct physical (e.g., wired) communication and/or constant communication, but rather includes selective communication at periodic or aperiodic intervals, as well as one-time messages. In some examples, the example network device 104 includes gateway functionality such as modem capabilities. In some other examples, the example network device 104 is implemented in two or more devices (e.g., a router, a modem, a switch, a firewall, etc.).

The network meter 106 of the illustrated example of FIG. 1 is a device that monitors the network traffic data flowing through the network device 104. In some examples, the network meter 106 may be a single home unit and may have the functionality to collect network traffic data streaming on the network device 104. The network meter 106 may also be configured to communicate with other devices in the media exposure measurement location 102 such as, for example, the media presentation device meter 110 and the streaming device 112. The network meter 106 may configured to collect additional network traffic data related to the type of media being streamed to the media presentation device 108 after receiving the notification from the media presentation device 108. The network meter 106 may also be configured to query devices in the media exposure measurement location 102 to determine information on active processes running on the other devices in the media exposure measurement location 102. For example, the example network meter 106 of FIG. 1 queries the streaming device 112 to determine the active application running on the streaming device 112. The example network meter 106 is configured to communicate with the central facility 118 via the network device 104. The network meter 106 may transmit the network traffic data and the information determined in querying the other devices in the media exposure measurement location 102 to the central facility 118.

As used herein, the term "network traffic data" includes a variety of metrics of a network device and/or network traffic including Internet Protocol (IP) addresses, URLs, domain names, Multipurpose Internet Mail Extension (MIME) types, bandwidth, duration of events, count of events, etc. Duration of events may refer to the amount of time that a session between a host device (e.g. a router, the network device 104) and a client device (e.g. the streaming device 112) exists. Count of event may refer to the number of communications between a client device and a host device to maintain the session.

The media presentation device 108 of the illustrated example of FIG. 1 is a device that may receive any type of media and present the media. The media presentation device 108 may be, for example, an Internet-enabled television, a personal computer, an Internet-enabled mobile handset (e.g., a smartphone), a tablet computer (e.g., an iPad), etc. The media presentation device 108 may present media sent from the streaming device 112 via a wired or wireless connection to the streaming device 112, a wired or wireless connection to a media service provider, etc. The media presentation device 108 may present the media streaming to it from the streaming device 112 with supplementary media presentation devices such as speakers, projectors, additional screens, etc.

The media presentation device meter 110 of the illustrated example of FIG. 1 is a device which meters the media being presented on the media presentation device 108. The example media presentation device meter 110 is configured to collect streaming data on the media being streamed to the media presentation device 108. Streaming data may include, for example, signatures, watermarks, or other metering metrics related to the streaming media on the media presentation device 108. Additionally, the media presentation device meter 110 may be configured to generate audio signatures and/or video signatures and/or extract audio and/or video watermarks from the audio and video output of the media being presented by the media presentation device 108. The audio output of the media presentation device 108 may be processed to detect audio codes and/or generate audio signatures for the streaming media. The video output of the media presentation device 108 may be processed to generate video signatures of the streaming media.

In some examples, the media presentation device meter 110 of FIG. 1 may also be configured to detect the streaming device 112 that the media is being streamed from. With the collected and/or generated and/or extracted streaming data, the media presentation device meter 110 may generate a monitoring report including the media being streamed and the identity of the streaming device 112 streaming the media. The media presentation device meter 110 may also be configured to send the monitoring report to the central facility 118 via a connection with the network device 104. The media presentation device meter 110 may further be configured to communicate with the network meter 106 to transmit a notification from the media presentation device meter 110 to the network meter 106 that may indicate the identity of the streaming device 112 and/or the type of media being streamed by the streaming device 112. The notification from the media presentation device meter 110 to the network meter 106 may also indicate a variety of other metrics about either the streaming device 112, the media presentation device 108, and/or other media presentation devices that may be monitored by media presentation device 108.

In some examples, the media presentation device meter 110 and the network meter 106 may be unable to transmit information to the central facility 118 via the network meter. For example, a server upstream of the network device 104 may not provide functional routing capabilities to the central facility 118. In the illustrated example of FIG. 1, the network meter 106 includes additional capabilities to send information through the wireless communication system 116 (e.g., the cellular communication system) via the network meter communication link 120. The media presentation device meter 110 includes additional capabilities to send information through the wireless communication system 116 via the media presentation device meter communication link 122.

The network meter communication link 120 and the media presentation device meter communication link 122 of the illustrated example of FIG. 1 are cellular communication links. However, any other method and/or system of communication may additionally or alternatively be used such as, for example, and Ethernet connection, a Bluetooth connection, a Wi-Fi connection, etc. Further, the network meter communication link 120 and the media presentation device meter communication link 122 of FIG. 1 implement a cellular connection via a Global System for Mobile Communications (GSM). However, any other systems and/or protocols for communication may be used such as, for example, Time Division Multiple Access (TDMA), Code Division Multiple Access (CDMA), Worldwide Interoperability for Microwave Access (WiMAX), Long term Evolution (LTE), etc.

The streaming device 112 of the illustrated example of FIG. 1 is a device that retrieves media from a service provider for presentation. In some examples, the streaming device 112 is capable of sending the retrieved media to a media presentation device 108. The media may be sent via a wired or wireless connection to the media presentation device 108. In examples such as these, the streaming device 112 may include digital media players (e.g., a Roku media player, an Amazon Fire TV Stick, a Google Chromecast, Amazon Fire TV Cube, a Slingbox, etc.), video game consoles (e.g., Xbox, PlayStation), etc.

The example central facility 118 of the illustrated example of FIG. 1 is a server that collects and processes media monitoring information from the network meter 106 and the media presentation device meter 110 to generate exposure metrics related to presented media. The central facility 118 analyzes the media monitoring information to identify, for example, traffic profiles for streaming media, which media presentation devices are the most owned, the most-frequently used, the least-frequently owned, the least-frequently used, the most/least-frequently used for particular type(s) and/or genre(s) of media, and/or any other media statistics or aggregate information that may be determined from the data. The media presentation device information may also be correlated or processed with factors such as geodemographic data (e.g., a geographic location of the media exposure measurement location, age(s) of the panelist(s) associated with the media exposure measurement location 102, an income level of a panelist, etc.) Media presentation device information may be useful to manufacturers and/or advertisers to determine which features should be improved, determine which features are popular among users, identify geodemographic trends with respect to media presentation devices, identify market opportunities, and/or otherwise evaluate their own and/or their competitors' products.

In the illustrated example of FIG. 1, the central facility 118 may receive and/or obtain Internet messages (e.g., a HyperText Transfer Protocol (HTTP) request(s)) that include the metering information. Additionally or alternatively, any other method(s) to receive and/or obtain metering information may be used such as, for example, an HTTP Secure protocol (HTTPS), a file transfer protocol (FTP), a secure file transfer protocol (SFTP), etc.

In the illustrated example of FIG. 1, a panelist in the media exposure measurement location 102 may access media via the streaming device 112. The streaming device 112 connects to the network 114 (e.g. the Internet) via the network device 104 and streams media to the media presentation device 108. The media presentation device 108 presents the media, for example, the media presentation device 108 presents the media on a display as well as supplemental media presentation devices (e.g. speakers).

The media presentation device meter 110 of FIG. 1 monitors the media presentation device 108 and may collect streaming data such as, for example, watermarks and/or codes and/or signatures for the visual and audio media presented on the media presentation device 108. For example, the media presentation device meter 110 may generate audio signatures and/or video signatures and/or extract audio and/or video watermarks from the audio and video output of the media being presented by the media presentation device 108. The audio output of the media presentation device 108 may be processed to detect audio codes and/or generate audio signatures for the streaming media. The video output of the media presentation device 108 may be processed to generate video signatures of the streaming media. Additionally, the media presentation device meter 110 may be configured to detect the streaming device 112 that the media is being streamed from as well as the type of media being streamed by the streaming device 112 and notify the network meter 106.

The media presentation device meter may also generate a monitoring report based on the collected data that includes the media being streamed and the identity of the streaming device 112 streaming the media. The media presentation device meter 110 may also be configured to send the monitoring report to the central facility 118 via a connection with the network device 104. If communication with the central facility 118 is obstructed via the network 114, the media presentation device meter 110 may also send the monitoring report to the central facility 118 via the media presentation device meter communication link 122. The media presentation device meter 110 may have the functionality to store the collected streaming data and/or the monitoring reports before transmitting the information to the central facility 118.

The network meter 106 may be configured so that upon receiving the notification from the media presentation device meter 110, the network meter 106 may collect network traffic data. The network meter 106 may additionally identify, from the notification from the media presentation device meter 110, the type of media streaming to the media presentation device 108. After identifying the type of media, the network meter 106 may collect additional network traffic data related to the type of media being streamed to the media presentation device 108. Additionally, the network meter may identify, from the notification from the media presentation device 108, the identity of the streaming device 112. After identifying the streaming device 112, the network meter 106 may query the streaming device 112 to determine the active application running on the streaming device 112. After collecting the network traffic data and determining the active application on the streaming device 112 may store the network traffic data, the identity of the streaming device 112, an identifier for the active application on the streaming device 112, etc., before transmitting the information to the central facility 118 over the network 114 via the network device 104. If communication with the central facility 118 is obstructed via the network 114, the network meter 106 may also send the information to the central facility 118 via the network meter communication link 120.

After receiving, at the central facility 118, the streaming data and/or monitoring report from the media presentation device meter 110 and the network traffic data and/or the identifier for the active application on the streaming device 112 and/or the identity of the streaming device 112 from the network meter 106, the central facility 118 may combine the streaming data and the network traffic data to generate a traffic profile that is representative of the streaming media being presented on the media presentation device 108.

Figure 2:
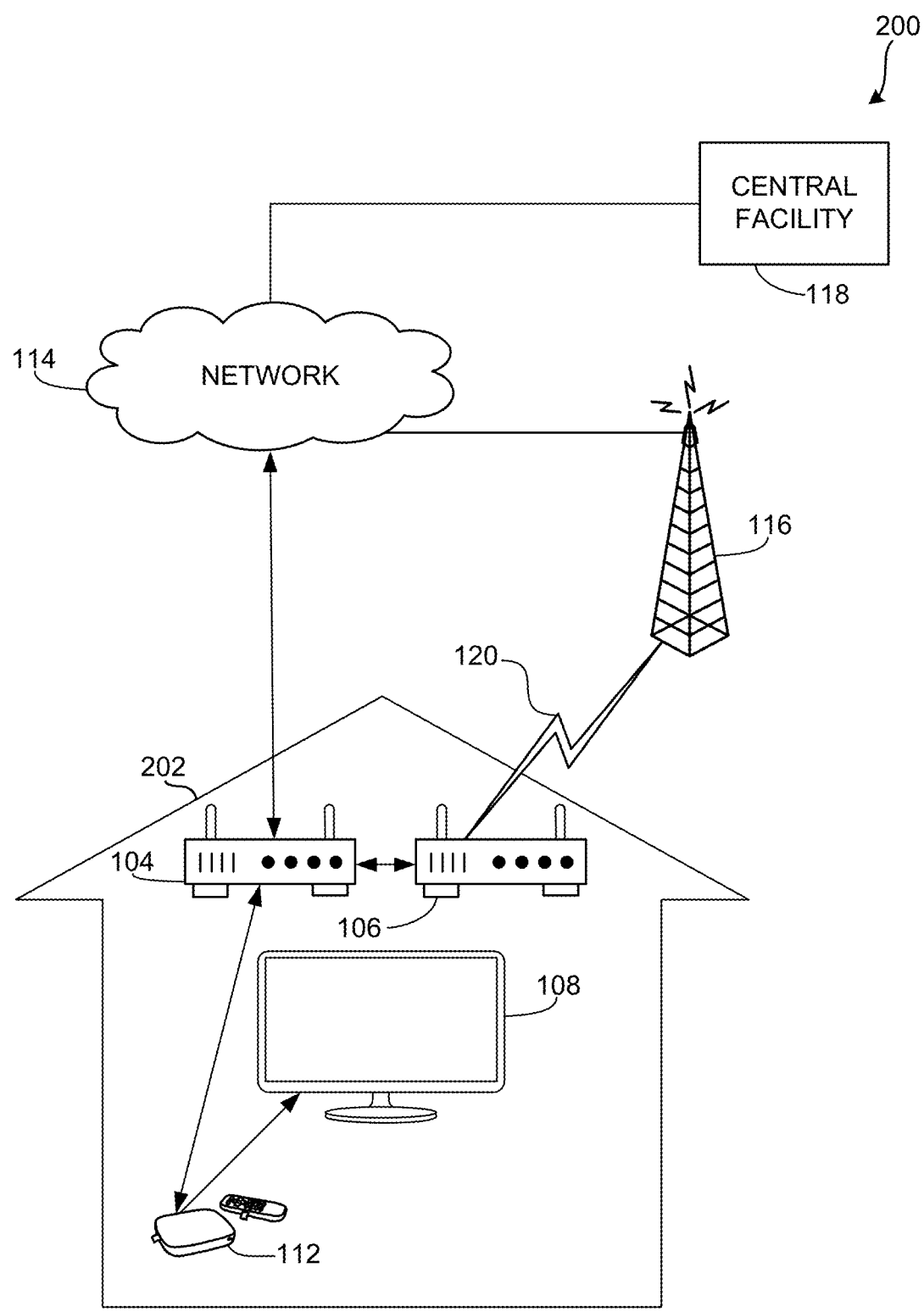
FIG. 2 is a block diagram of an example environment in which an example network meter monitors network traffic data.

FIG. 2 is a block diagram of an example environment 200 in which an example network meter 106 monitors network traffic data. The example environment 200 includes an example media exposure measurement location 202, an example network 114, an example wireless communication system 116, and an example central facility 118. The media exposure measurement location 202 includes an example network device 104, an example network meter 106, an example media presentation device 108, and an example streaming device 112.

The devices in the media exposure measurement location 202 of FIG. 2 operate in a similar manner as the devices in the media exposure measurement location 102 of FIG. 1. However, in the media exposure measurement location 202 of FIG. 2, the media presentation device meter 110 is absent. The absence of the media presentation device meter 110 changes the functional capabilities of monitoring media in the media exposure measurement location 202. Without the media presentation device meter 110, the central facility 118 cannot readily determine the media streaming from the streaming device 112 to the media presentation device 108. The loss of functionality comes from the fact that the network traffic data that is captured by the network meter 106 is encrypted and, thus, the payloads of the network traffic cannot be examined to determine that the traffic contains media being sent to streaming device 112.

The streaming device 112 of the illustrated example of FIG. 2 is a device that retrieves media from a service provider for presentation. In some examples, the streaming device 112 is capable of sending the retrieved media to a media presentation device 108. The media may be sent via a wired or wireless connection to the media presentation device 108. In examples such as these, the streaming device 112 may include digital media players (e.g., a Roku media player, an Amazon Fire TV Stick, a Google Chromecast, Amazon Fire TV Cube, a Slingbox, etc.), video game consoles (e.g., Xbox, PlayStation), etc.

In the illustrated example of FIG. 2, the central facility 118 may utilize the traffic profiles generated from at least one media exposure measurement location 102 of FIG. 1 to determine the media being streamed to the media presentation device 108 of the media exposure measurement location 202 of FIG. 2. With the advent of a traffic profile for media, the central facility may compare the network traffic data captured by the network meter 106 of FIG. 2 with the traffic profile and determine whether the pertinent network traffic data is present in the captured network traffic data to determine whether the media is being presented by the media presentation device 108.

Figure 3:
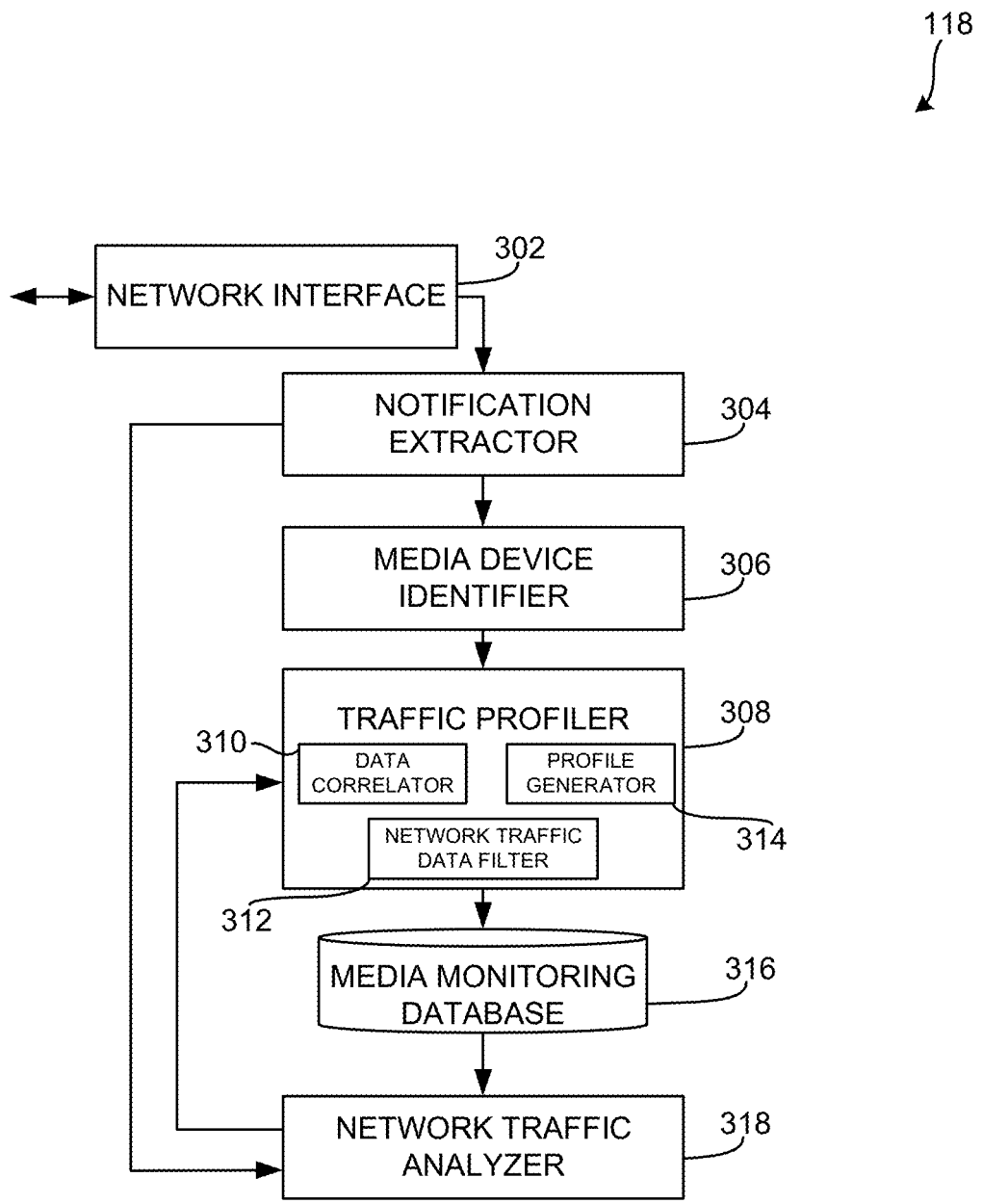
FIG. 3 is a block diagram of an example implementation of the central facility of FIGS. 1 and/or 2.

FIG. 3 is a block diagram of an example implementation of the central facility 118 of FIGS. 1 and/or 2. The central facility 118 of FIG. 3 includes an example network interface 302, an example notification extractor 304, an example media device identifier 306, an example traffic profiler 308, an example media monitoring database 316, and an example network traffic analyzer 318. The traffic profiler 308 includes an example data correlator 310, an example network traffic data filter 312, and an example profile generator 314. The example network interface 302 is coupled to networks that are exterior to the central facility 118 such as the network 114 of FIGS. 1 and/or 2. The example network interface 302 is coupled to the network traffic analyzer 318 as well as the notification extractor 304. The example notification extractor 304 is coupled to the media device identifier 306. The example media device identifier 306 is coupled to the traffic profiler 308. The example traffic profiler 308 is coupled to the media monitoring database 316 and the example media monitoring database 316 is coupled to the network traffic analyzer 318.

The network interface 302 of the illustrated example of FIG. 3 is a device that connects another device (e.g., the central facility 118) to a network (e.g., the network 114). The network interface 302 may be implemented as hardware or software. As a hardware the network interface 302 may be electronic circuits that facilitate the communication between a network (e.g., network 114) and the parts of a computer responsibly for processing the obtained network data (e.g., data from the network 114). The network traffic interface 302 obtains and/or transmits information to networks that are exterior to the central facility 118 such as the network 114. The network interface 302 may implement a web server to receive and/or obtain notifications including streaming data and network traffic data from the media presentation device meter 110 and the network meter 106, respectively. The notifications including the streaming data and/or the network traffic data may be formatted as an HTTP message; however, any other message format and/or protocol may additionally or alternatively be used such as, for example, a file transfer protocol (FTP), a simple message transfer protocol (SMTP), an HTTP secure (HTTPS) protocol, etc.

The notification extractor 304 of the illustrated example of FIG. 3 extracts information from the notifications that are received and/or obtained by the network interface 302. In some examples, the notification extractor 304 may extract the streaming data and the network traffic data from the notifications. The notification extractor 304 may also extract from the notifications the identity of the streaming device 112 in the media exposure measurement location 102 of FIG. 1 and/or the media exposure measurement location 202 of FIG. 2, the active application on the streaming device 112, and other information related to the network traffic data, the streaming data, or the streaming device 112. If the notification extractor 304 extracts only network traffic data from a media exposure measurement location (e.g., the media exposure measurement location 202), the notification extractor 304 will send the network traffic data to the network traffic analyzer 318 in order to be analyzed as well as the media device identifier 306 in order to be processed.

The media device identifier 306 of the illustrated example of FIG. 3 identifies the streaming device 112 of FIG. 2. The example media device identifier 306 utilizes the extracted information from the notification extractor 304 to identify the streaming device 112. For example, the identity of the streaming device 112, device manufacturer information, device type information, device operating system information, and/or device media access control (MAC) address information may be used to determine the identity of the streaming device 112. This information is useful to a media monitoring service and is useful in identifying streaming media using the traffic profile. For example, network traffic data that includes media that is streaming to a streaming device (e.g., the streaming device 112) may include specific network traffic data that is related to the particular streaming device. Knowing the identity of the streaming device 112 allows the example traffic profiler 308 to profile network traffic data based on the identity of the streaming device 112.

The example central facility 118 of FIG. 3, includes the example traffic profiler 308. The example traffic profiler 308 correlates network traffic data and streaming data from the media presentation device meter 110 of FIG. 1 and the network meter 106 of FIG. 1 and to generate a traffic profile of the pertinent network traffic data that is useful in characterizing specific network traffic data as relating to a presentation of streaming.

The example traffic profiler 308 accesses traffic profiles, network traffic data, streaming data, etc., that is stored in the example media monitoring databases 316 to apply additional correlation and filtering to the traffic profiles for certain streaming media. Additionally, the example traffic profiler 308 receives/obtains network traffic data from the network traffic data analyzer 318 that has been identified as not fitting any of the current traffic profiles of record. The traffic profiler 308 generates a number of robust traffic profiles for a number of streaming media that allow the network traffic analyzer 318 to more accurately analyze information that the central facility 118 receives and/or obtains.

The example traffic profiler 308 includes the data correlator 310. The data correlator 310 associates the network traffic data with the example streaming data obtained from the media presentation device meter 110 of FIG. 1. For example, streaming data may include audio and/or visual watermarks and/or signatures and/or codes of the streaming media with timestamps for when the media started streaming and when the media stopped streaming. In the example, the data correlator 310 associates the entries in the network traffic data with the timestamps in the streaming data. In the example, the data correlator 310 then associates two network traffic data entries with the start time and stop time of the streaming media. The data correlator 310 associates network traffic data entries with the timestamps in the streaming data by ordering the streaming data according to the timestamps of the streaming data and ordering the network traffic data according to the timestamps in the network traffic data. The data correlator 310 then established universal timestamps that corresponds to both the timestamps for the network traffic data and the timestamps for the streaming data. The universal timestamps are based off of the timestamps from the network traffic data and the timestamps from the streaming data. In the example, the data correlator 310 then selects the network traffic data that occurred after the network traffic data entry that corresponds to the start time of the streaming media and the network traffic data entry that corresponds to the stop time of the streaming media. This selected network traffic data is then used by the network traffic data filter 312.

The example network traffic data filter 312 filters excess network traffic data from the selected network traffic data. For example, there may be several events occurring on the network 114 during the start time and stop time of the streaming media. The example network traffic data filter 312 analyzes the selected network traffic data and determines the network traffic data entries that are related to the streaming media and the network traffic data entries that are not. The example network traffic data filter 312 determines which network traffic data entries are related to the streaming media based on the streaming data collected by the media presentation device meter 110 of FIG. 1. For example, network traffic data entries that are related to the streaming media include IP addresses, URLs, domain names, MIME types, bandwidth, duration of events, count of events that are representative of the streaming media. For example, if the streaming media is Netflix, an example of a network traffic data entry related to Netflix is a network traffic data entry with a duration of events that is 300 milliseconds, a count of events that is 30,000, and an example URL that is alami.nt-flx.com. A network traffic data entry that is related to Netflix is a network traffic data entry with a duration of events that is 4 milliseconds, a count of events that is 60, and an example URL that is www.google.com. The example network traffic data filter 312 removes the network traffic data entries that are not related to the streaming media from the selected network traffic data. After removing the network traffic data entries that are not related to the streaming media from the selected network traffic data, the filtered selected network traffic data is used by the example profile generator 314 to generate a traffic profile that is representative of the streaming media.

The example profile generator 314 generates a traffic profile based on the filtered selected network traffic data. The profile generator 314 determines a relationship between the filtered selected network traffic data and the streaming media. The relationship may be a number of pertinent network traffic data entries that occur when a streaming device 112 is streaming media to a media presentation device 108. The profile generator 314 may additionally be configured to combine a number of profiles in the media monitoring database 316 to form a more comprehensive set of pertinent network traffic data that occurs when a streaming device 112 is streaming media to a media presentation device 108.

In the illustrated example of FIG. 3, the central facility 118 includes the media monitoring database 316 to record data (e.g., traffic profiles, network traffic data, streaming data, etc.). In the illustrated example, the example media monitoring database 316 stores data (e.g., traffic profiles, network traffic data, streaming data, etc.) used to identify media being presented on media presentation devices 108. In some examples, the media monitoring database 316 additionally stores user identifying information and/or demographics such that received and/or obtained device identification information and/or media information can be translated into demographic information. The media monitoring database 316 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The media monitoring database 316 may additionally or alternatively be implemented by one or more double data rate (DDR) memories, such as DDR, DDR2, DDR3, mobile DDR (mDDR), etc. The media monitoring database 316 may additionally or alternatively be implemented by one or more mass storage devices such as hard disk drive(s), compact disk drive(s) digital versatile disk drive(s), etc. While in the illustrated example media monitoring database 316 is illustrated as a single database, the media monitoring database 316 may be implemented by any number and/or type(s) of databases. Furthermore, the data stored in the media monitoring database 316 may be in any data format such as, for example, binary data, comma delimited data, tab delimited data, structured query language (SQL) structures, etc.

In the illustrated example of FIG. 3, the example media monitoring database 316 stores data as, for example, flash memory, magnetic media, optical media, etc. Furthermore, the data stored in the media monitoring database 316 may be in any data format such as, for example, binary data, comma delimited data, tab delimited data, structured query language (SQL) structures, etc. In the illustrated example, the example media monitoring database 316 stores metadata (e.g., codes, signatures, etc.) used to identify media. In some examples, the media monitoring database 316 additionally stores user identifying information and/or demographics such that received and/or obtained user identifiers can be translated into demographic information.

The example central facility 118 includes the network traffic analyzer 318 to generate and/or prepare media measurement reports for the network traffic data that the central facility 118 obtains and/or receives. The network traffic analyzer 318 prepares media measurement reports indicative of the exposure of media on media presentation devices. In some examples, the network traffic analyzer 318 generates a report identifying demographics associated with the media via the received and/or obtained network traffic data, streaming data, and other notification information. For example, a network meter 106 at the media exposure measurement location 202 may collect network traffic data. The network traffic analyzer 318 may prepare a report associating the network traffic data with streaming media based on the traffic profiles saved in the media monitoring database 316. In some instances, the network traffic analyzer 318 generates a report identifying the type of streaming media being presented on the media presentation device 108. For example, the network traffic analyzer 318 prepares a report associating the obtained network traffic data with the saved traffic profiles. For example, the network traffic analyzer 318 associates the network traffic data with a media services (e.g. Netflix, Hulu, Amazon Prime Video, HBO GO, Showtime, Starz, etc.).

For example, the network traffic analyzer 318 obtains and/or receives network traffic data from the notification extractor 304. In the example, the network traffic analyzer 318 obtains and/or receives traffic profiles from the media monitoring database 316. The example network traffic analyzer 318 compares the network traffic data to the traffic profiles and generates a score for each traffic profile that indicates the level of similarity between the network traffic data and each traffic profile. The example network traffic data analyzer 318 ranks the scores from highest to lowest. In other examples, the network traffic analyzer 318 ranks the scores according to other parameters. If the highest score meets a threshold level of similarity, the network traffic data is categorized as relating to the traffic profile that corresponds to the highest score. However, if the highest score does not meet the threshold level of similarity the network traffic analyzer will re-analyze the network traffic data with new, different, traffic profiles. If the highest score fails to meet the threshold value of similarity more than a predetermined number of times, the network traffic data is sent to the traffic profiler 308 to be profiled into a new traffic profile. A score is determined to have met the threshold level of similarity when the score is within a predetermined distance of the threshold level of similarity.

The example network traffic analyzer 318 generates a report based on the analysis. The network traffic analyzer 318 may present the report on a display, webpage, and/or application interface. By presenting the report generated by the network traffic analyzer 318, a media monitoring service may use the report to determine how the way in which media is streamed, the frequency of streaming data, and/or other metrics that the network analyzer 318 may include in reports relates to the effectiveness of a media party's media, an advertiser's advertisement, etc.

Figure 4:
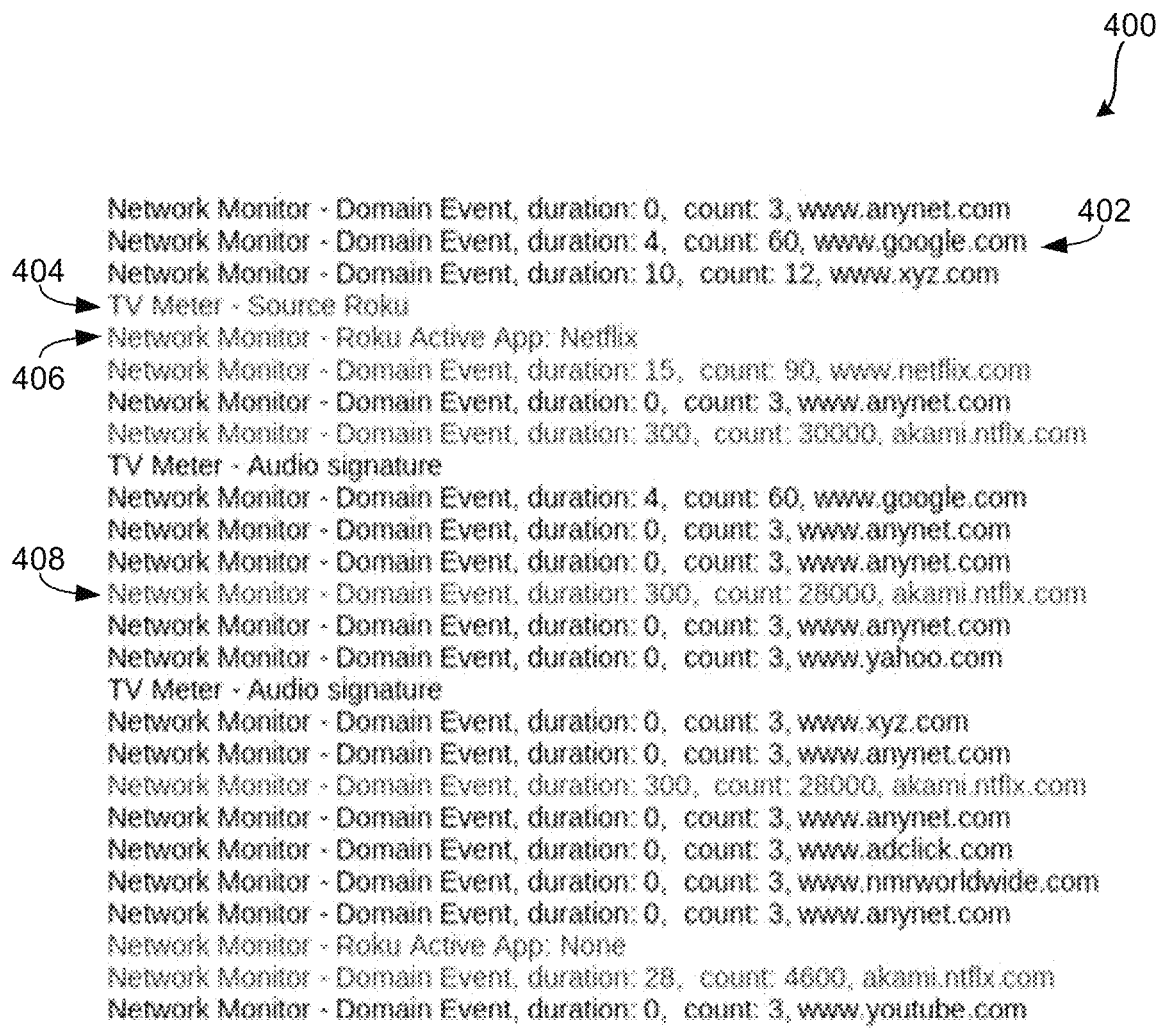
FIG. 4 is an illustration of example traffic profile that has been generated from the example environment of FIG. 2.

FIG. 4 is an illustration of an example traffic profile 400 generated by the example traffic profiler 308 of FIG. 3. The example traffic profile 400 is a preliminary traffic profile for streaming media (e.g. Netflix streaming media) that is generated from the example media exposure measurement location 102. In the illustrated example, the traffic profile 400 includes an example network traffic data entry 402, an example media presentation device meter entry 404, an example network traffic data entry 406, and an example network traffic data entry 408. Because the traffic profile 400 was generated from a single media exposure measurement location (e.g. media exposure measurement location 102), there may not be enough information to determine the network traffic data entries that are related to the streaming media and the network traffic data entries that are not. For example, the example network traffic data entry 402 does not relate to the streaming media. The network traffic data entry 402 includes a duration of 4 milliseconds, a count of 60 communications, and a URL of www.google.com. The network traffic data entry 402 is not related to the streaming media because the duration, the count, and the URL do not meet a set of criteria that is known to relate to the streaming media. For example, a duration the meets the set of known criteria may be a duration that is typically associated with the streaming media. An example duration that is associated with Netflix streaming media, may be, for example, 300 milliseconds. Additionally, an example count that is associated with Netflix streaming media is a count of 28,000. Furthermore, an example URL that is associated with Netflix streaming media is a URL of akami.ntflx.com. Network traffic data entries that are associated with (e.g. related to) a particular type of streaming media are not limited to the examples disclosed herein. Network traffic data entries that are related to a particular type of streaming media may be changed over time to maintain relevance to a particular type of streaming media as the streaming media changes over time.

In the illustrated example of FIG. 4, the traffic profile 400 includes the example media presentation device meter entry 404. The example media presentation device meter entry 404 includes an identity of a streaming device 112 of the media exposure measurement location 102. The media presentation device meter entry 404 may further include streaming data representative of the streaming media.

The example traffic profile 400 includes the example network traffic data entry 406 which is a network traffic data entry representative of the network meter 106 querying devices in the media exposure measurement location 102. For example, the network meter 106 queries the streaming device 112 and discover that the active application is, for example, the Netflix application. This is useful in the network traffic data because it allows the traffic profiler 308 to determine if the active application corresponds to the captured streaming data. If the active application corresponds to the captured streaming data, the traffic profiler 308 can, for example, utilize the network traffic data filter 312 to filter the network traffic data entries that are not related to the streaming media (e.g. the active application).

The example traffic profile 400 includes the example network traffic data entry 408. The example network traffic data entry 408 includes a duration of 300, a count of 28,000, and a URL of akami.ntflx.com. The network traffic data entry 408 is an example of a network traffic data entry that is related to the streaming media.

In the illustrated examples, the network traffic data filter 312 uses the traffic profile 400 and additional traffic profiles to filter out excess network traffic data entries that are not related to the streaming media (e.g. network traffic data entry 402). By filtering out excess network traffic data entries, the traffic profiler 308 generates more refined traffic profiles that are representative of the streaming media. Additionally, the traffic profiler 308, may utilize supervised machine learning techniques to compare multiple traffic profiles from a variety of media exposure measurement locations to identify the network traffic data entries that are representative of a particular type of streaming media and to filter out excess network traffic data entries. The traffic profiler 308 may also use supervised machine learning techniques to combine traffic profiles that are related to different types of streaming media to develop new traffic profiles that are representative of a combination of streaming media.

While an example manner of implementing the central facility 118 of FIGS. 1 and/or 2 is illustrated in FIG. 3, one or more of the elements, processes and/or devices illustrated in FIG. 3 may be combined, divided, re-arranged, omitted, eliminated and/or implemented in any other way. Further, the example data correlator 310, the example network traffic data filter 312, the example profile generator 314, the traffic profiler 308 and/or, more generally, the example central facility of FIGS. 1 and/or 2 may be implemented by hardware, software, firmware and/or any combination of hardware, software and/or firmware. Thus, for example, any of the example data correlator 310, the example network traffic data filter 312, the profile generator 314, the traffic profiler 308 and/or, more generally, the example central facility 118 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data correlator 310, the example network traffic data filter 312, the profile generator 314, and/or the example traffic profiler 308 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 118 of FIGS. 1 and/or 2 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
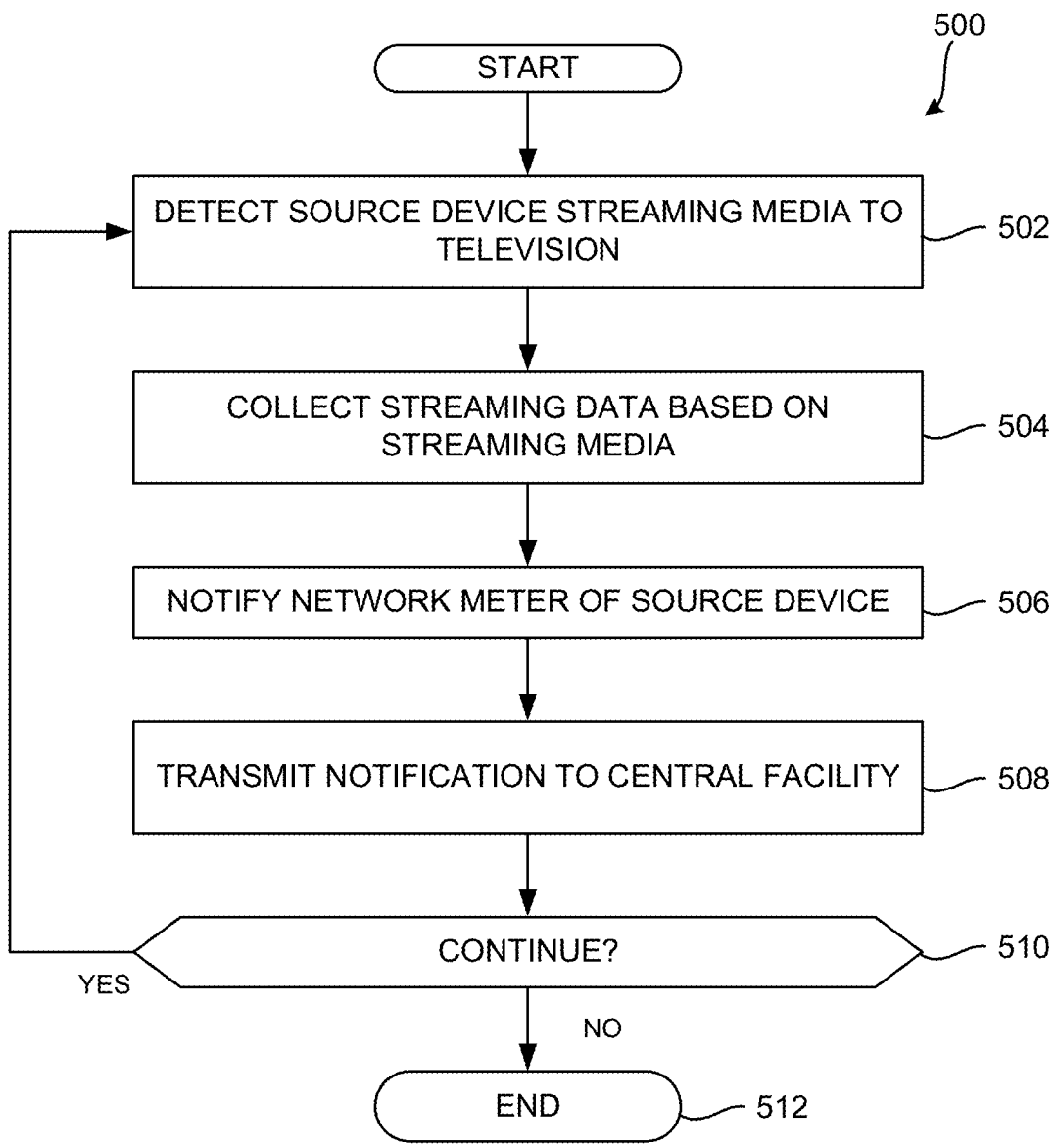
FIG. 5 is a flowchart representative of example machine readable instructions which may be executed to implement media presentation device meter of FIG. 1.

A flowchart representative of example hardware logic, machine readable instructions, hardware implemented state machines, and/or any combination thereof for implementing the media presentation device meter 110 of FIGS. 1 and/or 2 is shown in FIG. 5. The machine readable instructions may be an executable program or portion of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the entire program and/or parts thereof could alternatively be executed by a device other than the processor and/or embodied in firmware or dedicated hardware. Further, although the example program is described with reference to the flowchart illustrated in FIG. 5, many other methods of implementing the example media presentation device meter 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIG. 5 is a flowchart representative of example machine readable instructions which may be executed to implement the example media presentation device meter 110 of FIG. 1. The program of FIG. 5 begins at block 502 where the media presentation device 110 detects a streaming device streaming media to the media presentation device 108. The program 500 continues at block 504 where the media presentation device meter 110 collects streaming data based on the streaming media. The streaming data includes, for example, signatures, watermarks, or other metering metrics related to the streaming media on the media presentation device 108. Additionally, at block 504, the media presentation device meter 110 generates audio signatures and/or video signatures and/or extract audio and/or video watermarks from the audio and video output of the media being presented by the media presentation device 108. The audio output of the media presentation device 108 is processed to detect audio codes and/or generate audio signatures for the streaming media. The video output of the media presentation device 108 is processed to generate video signatures of the streaming media.

In the illustrated example of FIG. 5, the program 500 continues at block 506 where the media presentation device meter 110 notifies the network meter 106 of an identity of a streaming device (e.g., the identity of the streaming device 112). Next in the program 500, at block 508, the media presentation device meter 110 transmits a notification to the central facility 118. The notification may include the collected streaming data as well as the identity of the streaming device 112. In the illustrated example, the media presentation device meter 110 is configured to transmit the notification to the central facility 118 via the media presentation device meter communication link 122, and additionally via the network device 104. Because of the capability of multiple modes of communication, the media presentation device meter 110 may transmit the collected streaming data to the central facility 118 when there are obstructions to network communication via the network 114.

At block 510, the media presentation device meter 110 determines whether to continue monitoring the media presentation device 108 and communicating with the network meter 106 and the central facility 118. If the media presentation device meter 110 determines that it will continue monitoring the media presentation device 108 and communicating with the network meter 106 and the central facility 118 the program 500 proceeds to block 502. However, if the media presentation device meter 110 determines that it will not continue monitoring the media presentation device 108 and communicating with the network meter 106 and the central facility 118, the program 500 ends at block 512.

Figure 6:
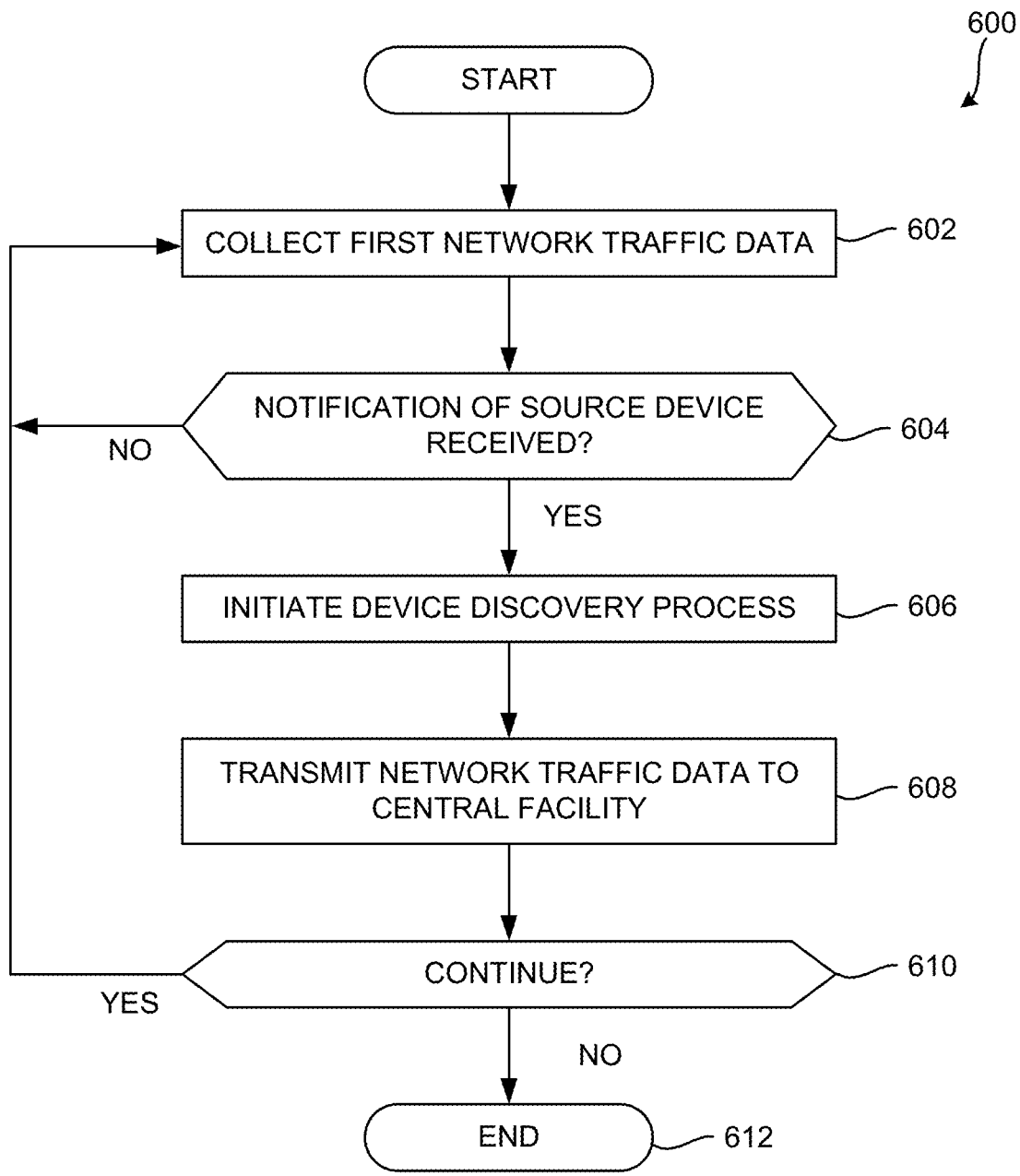
FIG. 6 is a flowchart representative of example machine readable instructions which may be executed to implement the network meter of FIGS. 1 and 2.

A flowchart representative of example hardware logic, machine readable instructions, hardware implemented state machines, and/or any combination thereof for implementing the network meter 106 of FIGS. 1 and/or 2 is shown in FIG. 6. The machine readable instructions may be an executable program or portion of an executable program for execution by a computer processor. The program may be embodied in software stored on a non-transitory computer readable storage medium such as a CD-ROM, a floppy disk, a hard drive, a DVD, a Blu-ray disk, or a memory associated with the processor, but the entire program and/or parts thereof could alternatively be executed by a device other than the processor and/or embodied in firmware or dedicated hardware. Further, although the example program is described with reference to the flowchart illustrated in FIG. 6, many other methods of implementing the example network meter 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIG. 6 is a flowchart representative of example machine readable instructions which may be executed to implement the network meter of FIGS. 1 and 2. The program 600 of FIG. 6 begins at block 602 where the example network meter 106 collects network traffic data. The network traffic data includes, for example, IP addresses, URLs, domain names, MIME types, bandwidth, duration of events, count of events, etc.

The program 600 continues at block 604 where the network meter 106 monitors a network (e.g. the network 114) for a notification of an identity of a streaming device (e.g. streaming device 112). If the notification is not received and/or obtained, the program 600 continues to block 602. However, if the notification is received and/or obtained, the program 600 continues to block 606 where the network meter 106 initiates a device discovery process. The example device discovery process of block 606 causes the network meter 106 to query devices in the media exposure measurement location 102 to determine information on active processes running on the other devices in the media exposure measurement location 102. For example, the network meter 106 queries the streaming device 112 to determine the active application running on the streaming device 112.

Next, the program 600 of the illustrated example of FIG. 6 continues to block 608 where the network meter 106 transmits the collected network traffic data to the central facility 118. In the illustrated example, the network meter 106 is configured to transmit the collected network traffic data to the central facility 118 via the network meter communication link 120, and additionally via the network device 104. Because of the capability of multiple modes of communication, the network meter 106 may transmit the collected network traffic data to the central facility 118 when there are obstructions to network communication via the network 114. After the network meter 106 transmits the network traffic data to the central facility 118, the program 600 continues to block 610.

At block 610, the network meter 106 determines whether to continue monitoring the network device 104 and communicating with the media presentation device meter 110 and the central facility 118. If the network meter 106 determines that it will continue monitoring the network device 104 and communicating with the media presentation device meter 110 and the central facility 118 the program 600 proceeds to block 602. However, if the network meter 106 determines that it will not continue monitoring the network device 104 and communicating with the media presentation device meter 110 and the central facility 118, the program 600 ends at block 612.

Figure 7:
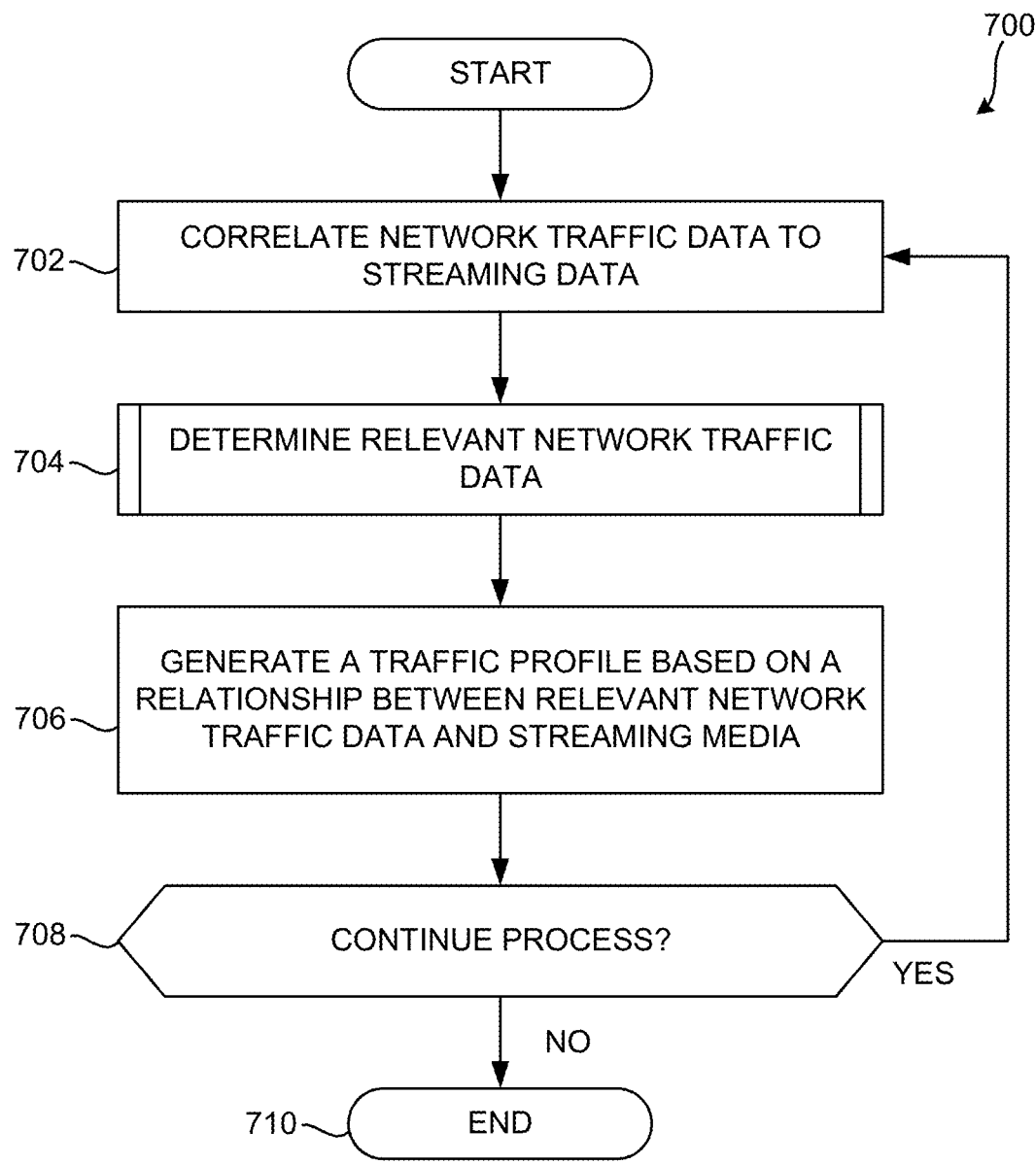
FIG. 7 is a flowchart representative of example machine readable instructions which may be executed to implement the central facility of FIG. 3.
Figure 8:
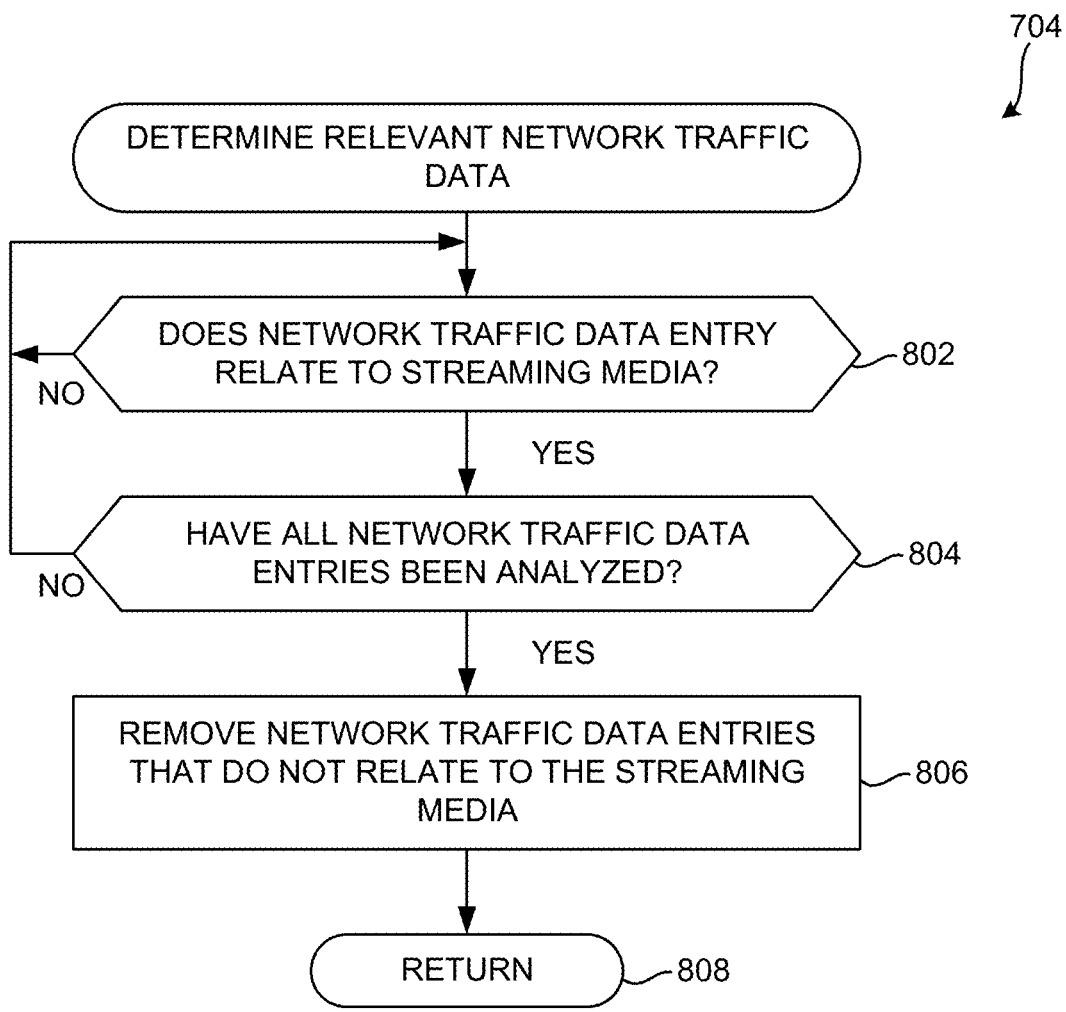
FIG. 8 is a flowchart representative of example machine readable instructions which may be executed to implement the central facility of FIG. 7.
Figure 9:
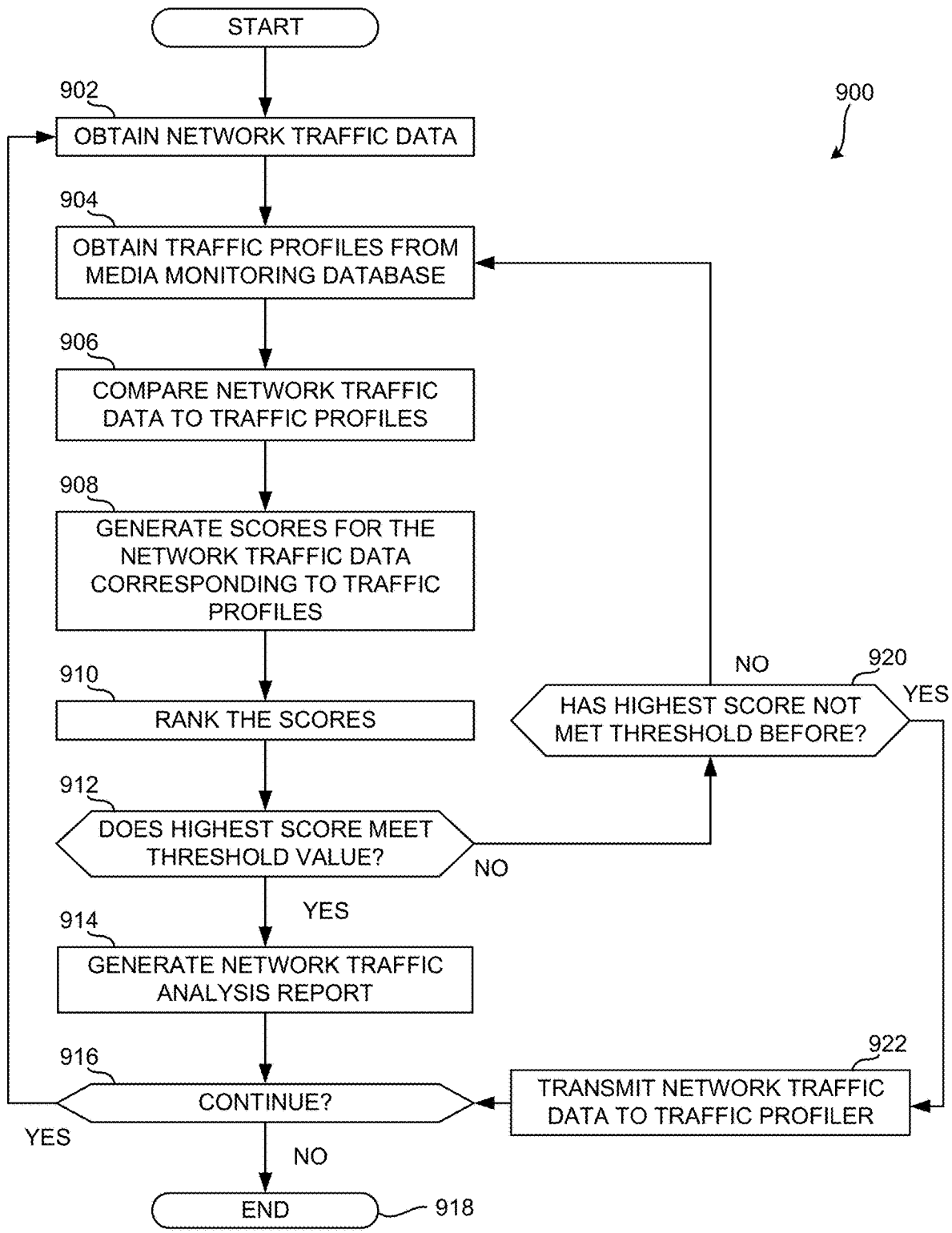
FIG. 9 is a flowchart representative of example machine readable instructions which may be executed to implement the example network traffic analyzer of FIG. 3.

Flowcharts representative of example hardware logic, machine readable instructions, hardware implemented state machines, and/or any combination thereof for implementing the central facility 118 of FIGS. 1, 2, and/or 3 are shown in FIGS. 7, 8, and 9. The machine readable instructions may be an executable program or portion of an executable program for execution by a computer processor such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 7, 8, and 9, many other methods of implementing the example central facility 118 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

FIG. 7 is a flowchart representative of example machine readable instructions which may be executed to implement the traffic profiler 308 of FIG. 3. The program 700 begins at block 702 where the traffic profiler 308 utilizes the data correlator 310 to correlate the collected network traffic data and the captured streaming data. The data correlator 310 correlates the network traffic data and the streaming data by associating the network traffic data with the duration of the streaming media that is included in the streaming data. For example, the streaming data includes timestamps at each entry of streaming data. The data correlator 310 may determine the start time and stop time of a particular streaming media. Additionally, the network data includes, for example, timestamps at each network traffic data entry. The data correlator 310 associates the network data with timestamps between the start time and stop time of the streaming media as specified by the streaming data.

The program 700 continues to block 704 where the network traffic data filter 312 determines the network traffic data that is relevant to the streaming media. For example, the network traffic data filter 312 filters excess network traffic data that does not relate to the streaming data. Next, the program 700 continues at block 706 where the profile generator 314 generates a traffic profile. The traffic profile is, for example, the traffic profile 400 of FIG. 4. The example profile generator 314 generates the traffic profile 400 based on a relationship between the relevant network traffic data and the streaming media. The relationship between the relevant network traffic data and the streaming media is based on the correlation between pertinent network traffic data and the streaming media. In other words, the example traffic profile 400 is based on a relationship between the network traffic data that is relevant and pertinent to the streaming media. The relationship is defined so that the network data that is categorized as pertinent to the streaming media may be used to determine whether other network traffic data from a different media exposure measurement location (e.g. media exposure measurement location 202) corresponds to a particular type of streaming data.

Next, the program 700 continues to block 708 where the traffic profiler 308 determines whether to continue the program or not. If the program is to continue, the program 700 continues to block 502 of the program 500 of FIG. 5. If, however, the program is to stop, the program 700 continues to block 710 where it ends.

FIG. 8 is a flowchart representative of example machine readable instructions which may be executed to implement block 704 of FIG. 7. The program begins at block 802 where the example network traffic data filter 312 determines whether the network traffic data from the media exposure measurement location 102 relates to the streaming media from the media exposure measurement location 102. The network traffic data filter 312 compares the network traffic data entries with the streaming data. The network traffic filter 312 determines whether each particular network traffic data entry relates to the streaming media by comparing the information in the network traffic data entries to the information from the streaming data such as watermarks, signatures, etc. If the network traffic data filter 312 determines that a network traffic data entry is not related to the streaming media, the network traffic data filter 312 marks or otherwise denotes the particular network traffic data entry as not related to the streaming media and proceeds to analyze the next network traffic data entry. If, however, the network traffic data filter 312 determines that the network traffic data entry does relate to the streaming media, the network traffic data filter 312 marks or otherwise denotes the particular network traffic data entry as related to the streaming media and proceeds to block 804.

At block 804, the example network traffic data filter 312 determines whether all the network traffic data entries have been analyzed. If the network traffic data filter 312 determines that all the network traffic data entries have not been analyzed, the network traffic data filter 312 proceeds to block 802, otherwise, the network traffic data filter 312 proceeds to block 806.

At block 806, the example network traffic data filter 312 removes the network traffic data entries that do not relate to the streaming media from the selected network traffic data. The network traffic data entries that are removed may be compared to other network traffic data from different media exposure measurement location to quickly identify network traffic data entries that are not related to the streaming media at the media exposure measurement location. At block 808, the network traffic data filter 312 returns to the program 700 and continues to block 706.

FIG. 9 is a flowchart representative of example machine readable instructions which may be executed to implement the example network traffic analyzer 318 of FIG. 3. The program 900 begins at block 902 where the example network traffic analyzer 318 obtains network traffic data from the notification extractor 304. At block 904, the example network traffic analyzer 318 obtains traffic profiles from the media monitoring database 316.

At block 906, the example network traffic analyzer 318 compares the network traffic data to the data profiles. At block 908 the example network traffic analyzer 318 generates a score for each traffic profile that corresponds to the similarity between the network traffic data and the traffic profile. At block 910 the example network traffic analyzer 318 ranks the scores.

At block 912, the example network traffic analyzer 318 determines if the highest ranked score meets a threshold value for similarity. If the highest ranked score does not meet the threshold value for similarity, the example network traffic analyzer 318 determines, at block 920, if the network traffic data being analyzed has had the highest ranked score not meet the threshold value of similarity before. If the highest ranked score has not met the threshold value of similarity before, the network traffic analyzer 312 proceeds to block 902. However, if the highest ranked score has met the threshold value of similarity before, the example network traffic analyzer 318 transmits, at block 922, the network traffic data to the traffic profiler 308 for further analysis. The network traffic analyzer 318 proceeds to block 916.

Returning to block 912, if the network traffic analyzer 318 determines that the highest ranked score meets the threshold value of similarity, the example network traffic analyzer 318 generates, at block 914, a network traffic analysis report identifying the type of streaming media being presented on the media presentation device 108. For example, the network traffic analyzer 318 prepares a report associating the obtained network traffic data with the saved traffic profiles. For example, the network traffic analyzer 318 associates the network traffic data with a media services (e.g. Netflix, Hulu, Amazon Prime Video, HBO GO, Showtime, Starz, etc.).

The network traffic analyzer 318 may present the report on a display, webpage, and/or application interface. By presenting the report generated by the network traffic analyzer 318, a media monitoring service may use the report to determine how the way in which media is streamed, the frequency of streaming data, and/or other metrics that the network analyzer 318 may include in reports relates to the effectiveness of a media party's media, an advertiser's advertisement, etc.

The example network traffic analyzer 318 determines, at block 916, whether to continue the program 900. If the network traffic analyzer 318 determines to continue the program 900, the network traffic analyzer 318 proceeds to block 902. If, however, the network traffic analyzer 318 determines not to continue the program 900, the network traffic analyzer 318 proceeds to block 918 where the program 900 ends. As mentioned above, the example processes of FIGS. 5, 6, 7, 8, and 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

Figure 10:
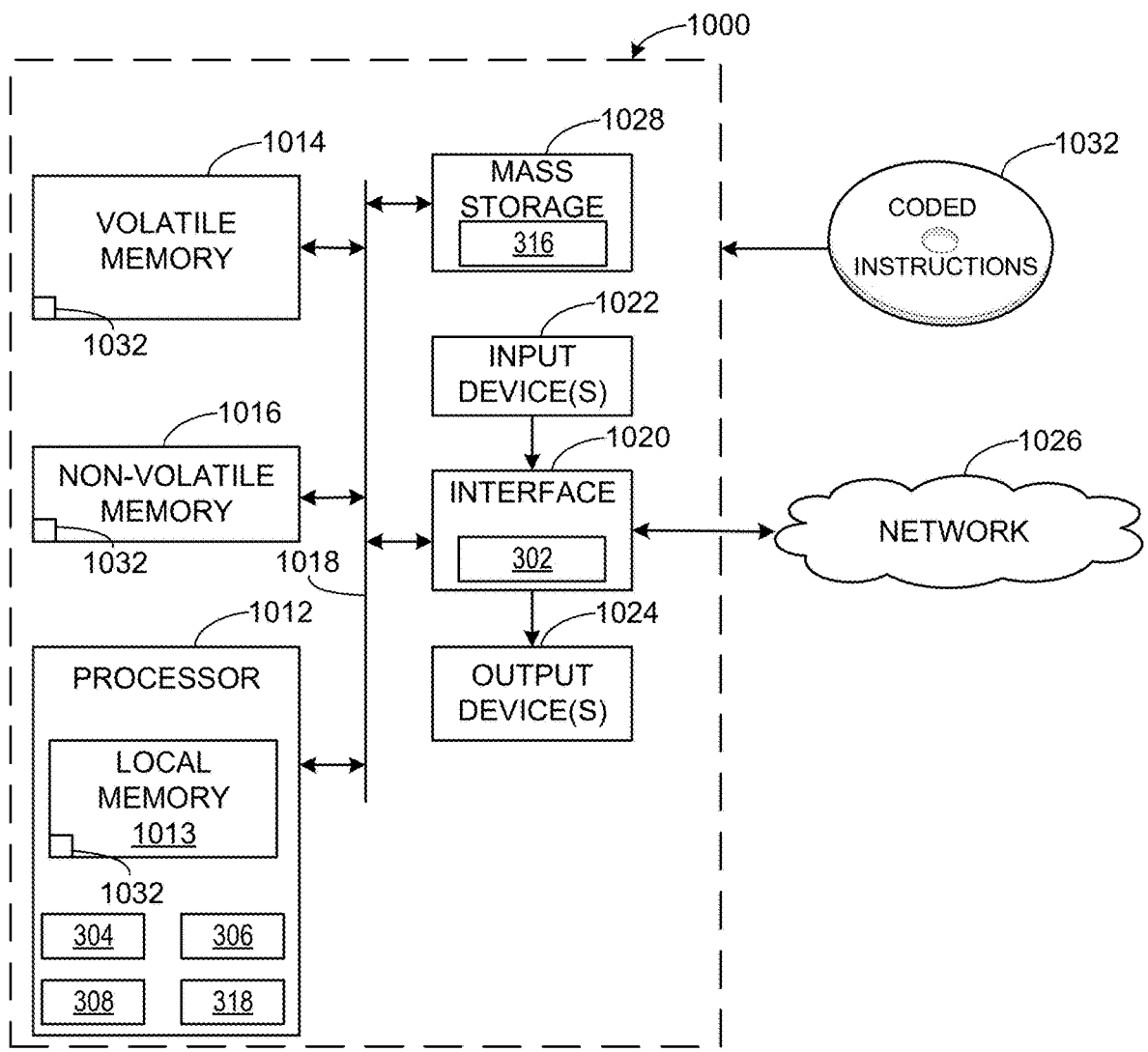
FIG. 10 is a block diagram of an example processing platform structured to execute the instructions of FIGS. 7, 8 and 9 to implement the central facility of FIG. 1 and/or FIG. 3.

FIG. 10 is a block diagram of an example processor platform 1000 structured to execute the instructions of FIGS. 7, 8, and 9 to implement the apparatus of FIG. 3. The processor platform 1000 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the notification extractor 304, the media device identifier 306, the traffic profiler 308, the network traffic analyzer 318 of FIG. 3.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In this example, the interface 1020 includes the network interface 302 of FIG. 3.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives. In the illustrated example of FIG. 10 the mass storage device 1028 includes one or more media monitoring databases 316.

The machine executable instructions 1032 of FIG. 7 may be stored in the mass storage device 1028, in the volatile memory 1014, in the non-volatile memory 1016, and/or on a removable non-transitory computer readable storage medium such as a CD or DVD.

From the foregoing, it will be appreciated that example methods, apparatus and articles of manufacture have been disclosed that generate traffic profiles that may be used to identify streaming media being presented on a media presentation device when only a network meter is available. Traffic profiles include network traffic data entries that relate to a particular type of streaming media being presented on a media presentation device. Example methods, apparatus, and articles of manufacture disclosed herein allow for a media monitoring service to combine multiple traffic profiles to generate more refined traffic profiles according to particular media. Generating a more refined traffic profile according to particular media allows for media monitoring services to identify media streaming to a media presentation device in environments with only network metering. The disclosed methods, apparatus and articles of manufacture improve the efficiency of using a computing device by generating a traffic profile that reduces the computational intensity of determining a particular type of media by providing a traffic profile to which collected network traffic data can be compared to identify a particular media being presented on a media presentation device. Without a traffic profile to which collected network traffic data can be compared, a computer must process streaming data and analyze the collected network traffic data in view of the streaming data in order to determine the particular media being presented on a media presentation device. Furthermore, the disclosed methods, apparatus, and articles of manufacture disclosed herein eliminate the need for media presentation device meters to determine particular media being presented on a media presentation device. In other words, the disclosed methods, apparatus, and articles of manufacture disclosed herein reduce the computational and processing burden of media presentation device meters by eliminating the need for media presentation device meters. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    a data correlator to correlate first network traffic data collected by a network meter to streaming data collected by a media presentation device meter;
    a network traffic data filter to determine second network traffic data that pertains to streaming media streaming on a streaming device, the second network traffic data based on the first network traffic data; and
    a profile generator to generate a traffic profile based on a relationship between the second network traffic data and the streaming media streaming on the streaming device to reduce a computational burden of identifying the streaming media, the traffic profile including network traffic data entries indicative of the streaming media.

2. The apparatus of claim 1, wherein the data correlator is to:
obtain the first network traffic data via a network interface; and
obtain a notification including at least an identity of the streaming device and the streaming data.

3. The apparatus of claim 1, wherein, the first network traffic data includes at least one of domain names, IP addresses, URLs, MIME types, bandwidth, duration of events, and count of events.

4. The apparatus of claim 1, wherein, the data correlator is to correlate the first network traffic data to the streaming data by associating the first network traffic data to a duration of the streaming media.

5. The apparatus of claim 1, wherein, the network traffic data filter is to filter out excess network traffic data from the first network traffic data that is not related to the streaming device or the streaming media to determine the second network traffic data.

6. The apparatus of claim 1, wherein, the relationship between the second network traffic data and the streaming media is based on correlating pertinent network traffic data to the streaming media.

7. The apparatus of claim 6, wherein, the profile generator is to use the traffic profile and additional traffic profiles to modify the relationship between the second network traffic data and the streaming media to refine the pertinent network traffic data for the streaming media.

8. An apparatus comprising:
a traffic profiler to generate a traffic profile to reduce a computational burden of identifying streaming media being presented on a media presentation device, the traffic profile including first network traffic data indicative of the streaming media; and
a network traffic analyzer to:
obtain the traffic profile and second network traffic data corresponding to the streaming media; and
generate, in response to a score for the second network traffic data meeting a threshold of similarity, a network traffic analysis report identifying the streaming media being presented on the media presentation device.

9. The apparatus of claim 8, wherein the traffic profiler is to generate the traffic profile based on a relationship between the streaming media and the first network traffic data, the first network traffic data filtered from third network traffic data including excess network traffic data that does not pertain to the streaming media.

10. The apparatus of claim 8, wherein the score for the second network traffic data corresponds to similarity between the second network traffic data and the traffic profile, and the network traffic analyzer is to:
generate the score for the second network traffic data and additional scores for the second network traffic data, the additional scores corresponding to similarities between the second network traffic data and additional traffic profiles, respectively;
rank the score and the additional scores; and
in response to a highest one of the ranked scores meeting the threshold of similarity, generate the network traffic analysis report.

11. The apparatus of claim 10, wherein the network traffic analyzer is to, in response to determining that the highest one of the ranked scores does not meet the threshold of similarity, determine whether the highest one of the ranked scores has not met the threshold of similarity before.

12. The apparatus of claim 10, wherein the network traffic analyzer is to:
in response to determining that the highest one of the ranked scores has not met the threshold of similarity before, obtain additional traffic profiles from a media monitoring database; and
in response to determining that the highest one of the ranked scores has met the threshold of similarity before, transmit the second network traffic data to the traffic profiler for further analysis.

13. The apparatus of claim 8, wherein the network traffic analyzer is to present the network traffic analysis report on at least one of a display, webpage, or application interface.

14. The apparatus of claim 8, wherein the network traffic analysis report associates the second network traffic data with a media services providing the streaming media.

15. A non-transitory computer-readable storage medium comprising instructions that, when executed, cause a machine to at least:
generate a traffic profile to reduce a computational burden of identifying streaming media being presented on a media presentation device, the traffic profile including first network traffic data indicative of the streaming media;
obtain the traffic profile and second network traffic data corresponding to the streaming media; and
generate, in response to a score for the second network traffic data meeting a threshold of similarity, a network traffic analysis report identifying the streaming media being presented on the media presentation device.

16. The computer-readable storage medium of claim 15, wherein the instructions cause the machine to generate the traffic profile based on a relationship between the streaming media and the first network traffic data, the first network traffic data filtered from third network traffic data including excess network traffic data that does not pertain to the streaming media.

17. The computer-readable storage medium of claim 16, wherein the instructions cause the machine to:
obtain the third network traffic data; and
obtain a notification including at least an identity of a streaming device streaming the streaming media and streaming data representing the streaming media.

18. The computer-readable storage medium of claim 17, wherein the instructions cause the machine to correlate the third network traffic data to the streaming data by associating the first network traffic data to a duration of the streaming media.

19. The computer-readable storage medium of claim 17, wherein the instructions cause the machine to filter out the excess network traffic data from the third network traffic data that is not related to the streaming device or the streaming media to determine the first network traffic data.

20. The computer-readable storage medium of claim 16, wherein the relationship between the first network traffic data and the streaming media is based on correlating pertinent network traffic data to the streaming media.

21. The computer-readable storage medium of claim 16, wherein the instructions cause the machine to use the traffic profile and additional traffic profiles to modify the relationship between the first network traffic data and the streaming media to refine pertinent network traffic data for the streaming media.

22. The computer-readable storage medium of claim 15, wherein the score for the second network traffic data corresponds to similarity between the second network traffic data and the traffic profile, and the instructions cause the machine to:
  generate the score for the second network traffic data and additional scores for the second network traffic data, the additional scores corresponding to similarities between the second network traffic data and additional traffic profiles, respectively;
  rank the score and the additional scores; and
  in response to a highest one of the ranked scores meeting the threshold of similarity, generate the network traffic analysis report.

23. The computer-readable storage medium of claim 22, wherein the instructions cause the machine to, in response to determining that the highest one of the ranked scores does not meet the threshold of similarity, determine whether the highest one of the ranked scores has not met the threshold of similarity before.

24. The computer-readable storage medium of claim 22, wherein the instructions cause the machine to:
  in response to determining that the highest one of the ranked scores has not met the threshold of similarity before, obtain additional traffic profiles from a media monitoring database; and
  in response to determining that the highest one of the ranked scores has met the threshold of similarity before, transmit the second network traffic data for further analysis.

25. The computer-readable storage medium of claim 15, wherein the instructions cause the machine to present the network traffic analysis report on at least one of a display, webpage, or application interface.

26. The computer-readable storage medium of claim 15, wherein the network traffic analysis report associates the second network traffic data with a media services providing the streaming media.

27. The computer-readable storage medium of claim 15, wherein at least one of the first network traffic data or the second network traffic data includes at least one of domain names, IP addresses, URLs, MIME types, bandwidth, duration of events, and count of events.

28. A method comprising:
  generating a traffic profile to reduce a computational burden of identifying streaming media being presented on a media presentation device, the traffic profile including first network traffic data indicative of the streaming media;
  obtaining the traffic profile and second network traffic data corresponding to the streaming media; and
  generating, in response to a score for the second network traffic data meeting a threshold of similarity, a network traffic analysis report identifying the streaming media being presented on the media presentation device.

29. The method of claim 28, further including generating the traffic profile based on a relationship between the streaming media and the first network traffic data, the first network traffic data filtered from third network traffic data including excess network traffic data that does not pertain to the streaming media.

30. The method of claim 28, wherein the score for the second network traffic data corresponds to similarity between the second network traffic data and the traffic profile, and the method further includes:
  generating the score for the second network traffic data and additional scores for the second network traffic data, the additional scores corresponding to similarities between the second network traffic data and additional traffic profiles, respectively;
  ranking the score and the additional scores; and
  in response to a highest one of the ranked scores meeting the threshold of similarity, generating the network traffic analysis report.

31. The method of claim 30, further including, in response to determining that the highest one of the ranked scores does not meet the threshold of similarity, determining whether the highest one of the ranked scores has not met the threshold of similarity before.

32. The method of claim 30, further including:
  in response to determining that the highest one of the ranked scores has not met the threshold of similarity before, obtaining additional traffic profiles from a media monitoring database; and
  in response to determining that the highest one of the ranked scores has met the threshold of similarity before, transmitting the second network traffic data for further analysis.

33. The method of claim 28, further including presenting the network traffic analysis report on at least one of a display, webpage, or application interface.

34. The method of claim 28, wherein the network traffic analysis report associates the second network traffic data with a media services providing the streaming media.

35. An apparatus comprising:
  memory;
  instructions in the memory; and
  at least one processor to execute the instructions to:
    correlate first network traffic data collected by a network meter to streaming data collected by a media presentation device meter;
    determine second network traffic data that pertains to streaming media streaming on a streaming device, the second network traffic data based on the first network traffic data; and
    generate a traffic profile based on a relationship between the second network traffic data and the streaming media streaming on the streaming device to reduce a computational burden of identifying the streaming media, the traffic profile including network traffic data entries indicative of the streaming media.

36. The apparatus of claim 35, wherein, the at least one processor is to correlate the first network traffic data to the streaming data by associating the first network traffic data to a duration of the streaming media.

37. An apparatus comprising:
  memory;
  instructions in the memory; and
  at least one processor to execute the instructions to:
    generate a traffic profile to reduce a computational burden of identifying streaming media being presented on a media presentation device, the traffic profile including first network traffic data indicative of the streaming media;
    obtain the traffic profile and second network traffic data corresponding to the streaming media; and
    generate, in response to a score for the second network traffic data meeting a threshold of similarity, a network traffic analysis report identifying the streaming media being presented on the media presentation device.

38. The apparatus of claim 37, wherein the score for the second network traffic data corresponds to similarity between the second network traffic data and the traffic profile, and the at least one processor is to:
- generate the score for the second network traffic data and additional scores for the second network traffic data, the additional scores corresponding to similarities between the second network traffic data and additional traffic profiles, respectively;
- rank the score and the additional scores; and
- in response to a highest one of the ranked scores meeting the threshold of similarity, generate the network traffic analysis report.

* * * * *